United States Patent
Ahmed et al.

(10) Patent No.: US 9,921,881 B2
(45) Date of Patent: Mar. 20, 2018

(54) OPTIMIZING PERFORMANCE IN CEP SYSTEMS VIA CPU AFFINITY

(71) Applicants: Ibrahim Ahmed, Waterloo (CA); Palaniappan Gandhi, Flossmoor, IL (US); Mark Theiding, Alameda, CA (US)

(72) Inventors: Ibrahim Ahmed, Waterloo (CA); Palaniappan Gandhi, Flossmoor, IL (US); Mark Theiding, Alameda, CA (US)

(73) Assignee: SYBASE, INC., Dublin, CA (US)

( * ) Notice: Subject to any disclaimer, the term of this patent is extended or adjusted under 35 U.S.C. 154(b) by 550 days.

(21) Appl. No.: 14/318,279

(22) Filed: Jun. 27, 2014

(65) Prior Publication Data
US 2015/0347509 A1   Dec. 3, 2015

Related U.S. Application Data

(60) Provisional application No. 62/003,345, filed on May 27, 2014.

(51) Int. Cl.
*G06F 7/00* (2006.01)
*G06F 17/30* (2006.01)
*G06F 9/50* (2006.01)

(52) U.S. Cl.
CPC .................. *G06F 9/5033* (2013.01)

(58) Field of Classification Search
CPC ......... G06F 17/30463; G06F 17/30427; G06F 17/30958
See application file for complete search history.

(56) References Cited

U.S. PATENT DOCUMENTS

| | | |
|---|---|---|
| 5,745,778 A | 4/1998 | Alfieri |
| 7,487,232 B1 | 2/2009 | Matthews et al. |
| 7,584,476 B2 | 9/2009 | Chung et al. |
| 7,730,488 B2 | 6/2010 | Ilzuka et al. |
| 7,826,990 B2 * | 11/2010 | Nasle ................. G05B 23/0254 702/85 |
| 8,078,831 B2 | 12/2011 | Wang et al. |
| 8,099,631 B2 | 1/2012 | Tsvetkov |
| 8,327,363 B2 | 12/2012 | Gopalan et al. |
| 8,544,014 B2 | 9/2013 | Gopalan et al. |
| 8,549,524 B2 | 10/2013 | Jula |
| 8,589,949 B2 | 11/2013 | Biazetti et al. |
| 8,856,794 B2 | 10/2014 | Kruglick |
| 2006/0218123 A1 | 9/2006 | Chowdhuri |
| 2008/0243463 A1 * | 10/2008 | Lovas .................... G06Q 10/04 703/17 |

(Continued)

*Primary Examiner* — Hasanul Mobin
(74) *Attorney, Agent, or Firm* — Schwegman Lundberg & Woessner, P.A.

(57) ABSTRACT

In an example embodiment, performance is optimized in a complex event stream (CEP) system. Information about a plurality of CEP threads is obtained. Then nearness among the plurality of CEP threads is determined, wherein nearness between a first and a second CEP thread indicates how much interaction is expected to occur between the first and second CEP thread. Based on the determined nearness, the plurality of CEP threads are organized into a plurality of CEP thread groups. Then, each of the plurality of CEP thread groups are assigned to a different processing node, with each processing node having one or more processors and a memory.

14 Claims, 8 Drawing Sheets

(56) References Cited

U.S. PATENT DOCUMENTS

| | | | |
|---|---|---|---|
| 2009/0228474 A1* | 9/2009 | Chiu | G06F 17/30516 |
| 2009/0320036 A1* | 12/2009 | Ries | G06F 9/5033 |
| | | | 718/104 |
| 2011/0088035 A1* | 4/2011 | Etzion | G06F 17/30551 |
| | | | 718/102 |
| 2011/0093491 A1* | 4/2011 | Zabback | G06F 17/30451 |
| | | | 707/769 |
| 2011/0246223 A1* | 10/2011 | Rundensteiner | G06Q 10/06 |
| | | | 705/2 |
| 2012/0084788 A1* | 4/2012 | Sakamoto | G06F 9/5083 |
| | | | 718/105 |
| 2012/0092352 A1 | 4/2012 | Mallick et al. | |
| 2012/0284732 A1 | 11/2012 | Griglock et al. | |
| 2013/0091409 A1* | 4/2013 | Jeffery | G06F 17/30056 |
| | | | 715/202 |
| 2013/0103638 A1* | 4/2013 | Gupta | G06F 17/30592 |
| | | | 707/603 |
| 2013/0144866 A1* | 6/2013 | Jerzak | G06F 11/2035 |
| | | | 707/718 |
| 2013/0160024 A1 | 6/2013 | Shtilman et al. | |
| 2014/0237289 A1* | 8/2014 | de Castro Alves | G06F 11/202 |
| | | | 714/11 |
| 2014/0330851 A1* | 11/2014 | Sarkar | G06F 9/445 |
| | | | 707/756 |
| 2015/0052071 A1* | 2/2015 | Tsai | G06Q 10/00 |
| | | | 705/319 |

* cited by examiner

OPTIMIZING PERFORMANCE IN CEP SYSTEMS VIA CPU AFFINITY

CROSS-REFERENCE TO RELATED APPLICATIONS

This application claims the benefit of U.S. Provisional Application No. 62/003,345, filed May 27, 2014, entitled "Optimizing Performance in CEP Systems via CPU Affinity," which is incorporated herein by reference in its entirety.

TECHNICAL FIELD

This document generally relates to systems and methods for use with event streams. More specifically, this document relates to methods and systems for optimizing performance in complex event processing (CEP) systems via Central Processing Unit (CPU) affinity.

BACKGROUND

Event stream processing (ESP) is a set of technologies designed to assist the construction of event-driven information systems. ESP technologies can include event visualization, event databases, event-driven middleware, and event processing languages, or CEP. ESP deals with the task of processing multiple streams of event data with the goal of identifying the meaningful events within those streams. ESP enables applications such as algorithmic trading in financial services, radio frequency identification (RFID) event processing applications, fraud detection, process monitoring, and location-based services in mobile devices. Within an ESP system, a continuous data stream (comprising multiple, consecutive data items) is pushed through a query. Results of the query are subsequently pushed out of the system.

Typically, each operator (e.g. filter, join, etc.) in a CEP system gets its own processing threads. These threads are scheduled by the operating system based on scheduling policies. Such policies can work well for smaller machines with few CPUs, but generally do not work well with multicore machines with a large number of cores, especially where non-uniform memory access (NUMA) architecture is used. NUMA is a computer memory design where the memory access time depends on the memory location relating to the processor. Under NUMA, a processor can access its own local memory faster than a non-local memory. By providing a separate memory for each processor, no performance hits are encountered from multiple processors attempting to access the same memory. Unfortunately, existing CEP scheduling policies do not work well with NUMA devices.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, threads interacting tightly with each other are allocated, as much as possible, within a single NUMA node because communication between threads within a single NUMA node is substantially more efficient than communication between threads of different NUMA nodes.

In an example embodiment, threads within a CEP application are allocated to CPUs automatically. Knowledge about the CEP project (the tasks undertaken by the CEP application) and how its threads interact with each other is leveraged to group tightly interacting threads within a single NUMA node. To optimize thread assignment, the CEP server can analyze thread nearness. Nearness measures how much data is being fed from one thread to another. The higher the data exchange, the nearer the threads are to each other. Threads with high nearness are then grouped together, as much as possible, under one NUMA node in order to minimize memory access overhead.

Figure 1:
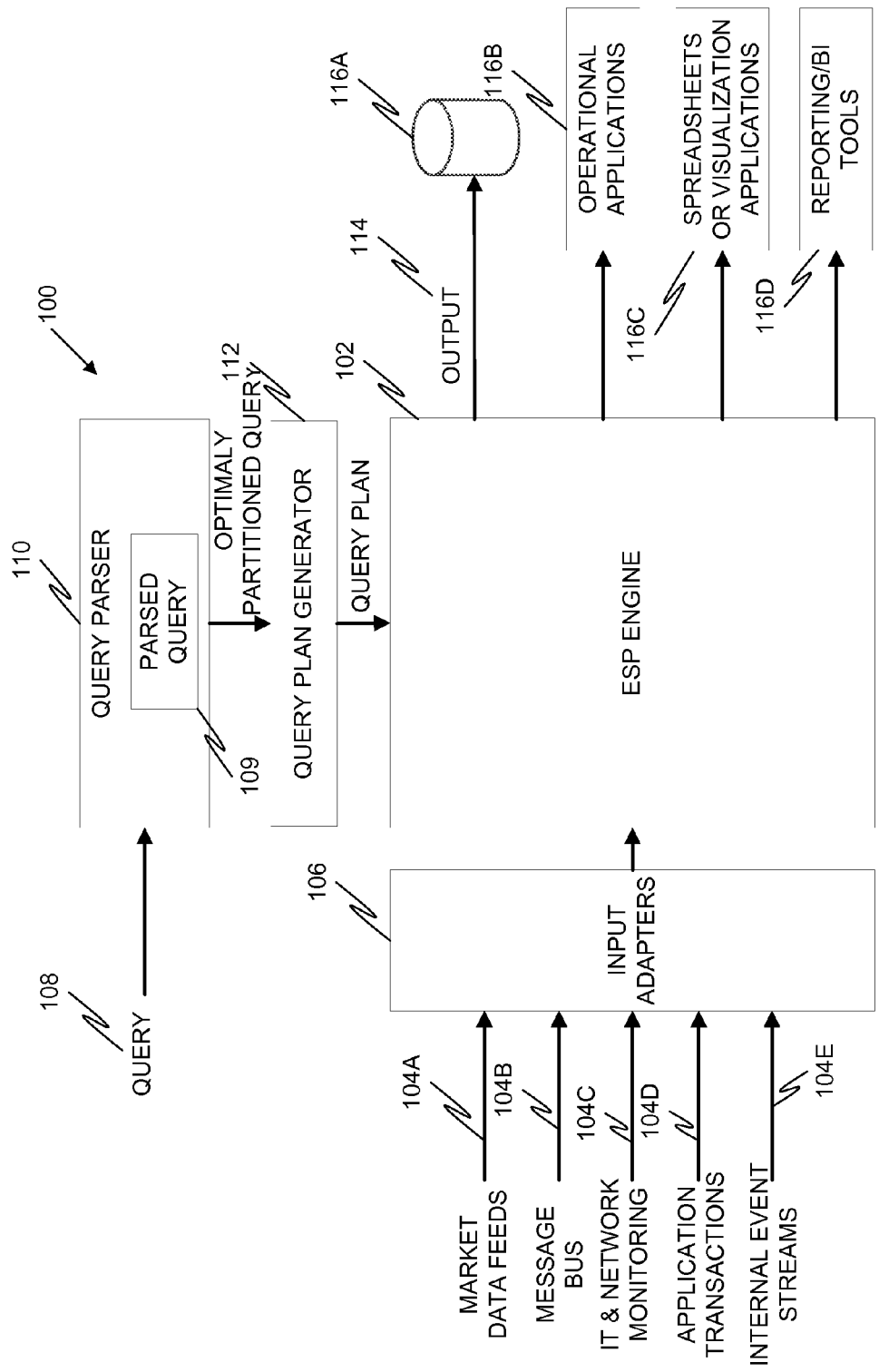
FIG. 1 is a diagram illustrating a system for event stream processing, in accordance with an example embodiment.

FIG. 1 is a diagram illustrating a system 100 for event stream processing, in accordance with an example embodiment. An ESP engine 102 can receive one or more event streams 104A-104E via input adapters 106. The event streams 104A-104E can relate to, for example, market data feeds, message buses, network monitoring, application transactions, internal event streams, and so forth. A query 108 can be parsed by a query parser 110 to create a parsed query 109. The query parser 110 can decompose the parsed query 109 into a network of operators, with each operator representing an atomic processing block, and represent the parsed query 109 as a directed, acyclic graph (DAG). The parsed query 109 is passed to a query plan generator 112, which can generate a query plan based on the parsed query 109 and send the query plan to the ESP engine 102. The ESP engine 102 can then utilize the query plan to obtain appropriate data matching the query plan from the event streams 104A-104E, and send the data as output 114.

In an example embodiment, the output 114 can be sent to a variety of different possible destinations, including databases 116A, operational applications 116B, spreadsheets or visualization applications 116C, and reporting/business intelligence (BI) tools 116D.

Figure 2:
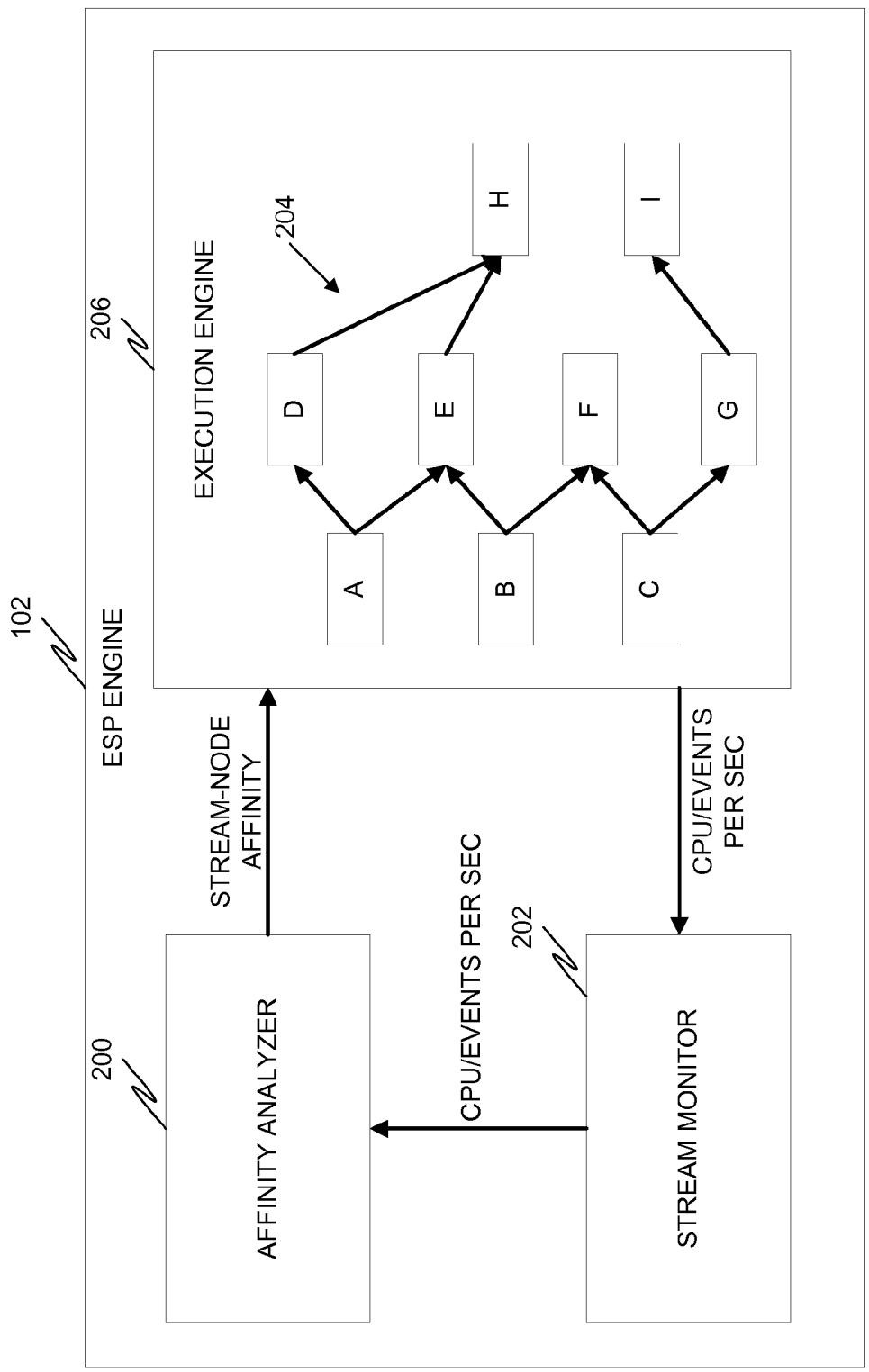
FIG. 2 is a diagram illustrating an ESP engine, in accordance with an example embodiment.

FIG. 2 is a diagram illustrating an ESP engine, in accordance with an example embodiment. In FIG. 2, the ESP engine is labeled as ESP engine 102 because in one example embodiment, the ESP engine 102 is the same ESP engine 102 as described in FIG. 1 above. However, in some example embodiments, the ESP engine in FIG. 2 can be different than that as described in FIG. 1.

The ESP engine 102 can include an affinity analyzer 200. The affinity analyzer 200 can examine a number of input parameters to determine an affinity level for each CEP thread in relation to a NUMA node. This affinity level can be called the "stream-node affinity." The stream-node affinity can be determined both at startup time and periodically during runtime. During startup time, the affinity analyzer 200 can analyze the DAG and/or parsed ESP query to determine stream-node affinity. There are other factors that can influence the stream node affinity as well, such as the number of NUMA nodes and the number of CPUs per NUMA node. The user can also provide user input (e.g., hints) that can influence the analysis, such as an indication of whether threads are dynamic, semi-static, or static. The affinity analyzer 200 can also perform some predictive analysis to determine likely behavior of the threads. The goal of the affinity analyzer 200 is to balance the grouping of parent threads and children threads (threads that interact with the parent thread) to the same NUMA node while also distributing the load across all NUMA nodes. This helps ensure the least number of NUMA nodes are used to fit the entire graph while also ensuring that the graph uses nodes that are close to each other.

During runtime, a stream monitor 202 can monitor CPU/events per time period (e.g., second) for the streams. The affinity analyzer 200 can then identify CPU scarcity and CPU abundance in NUMA nodes and redistribute streams across the nodes. The affinity analyzer 200 can, for example, move streams from an overloaded CPU, starting with the least CPU requests first, until there is enough CPU capacity. The affinity analyzer 200 can also move streams to the closest NUMA node with available CPU capacity to minimize memory access times. The affinity analyzer 200 can also reevaluate the nearness of threads in case the determination at startup time was incorrect or has changed.

Returning to the startup time description, the affinity analyzer 200 can begin by analyzing the static structure of the CEP project and creating a fully connected thread graph 204 representing stream-node affinity, which can be passed to an execution engine 206 where each node represents a different project thread. Each node can be assigned a value representing the processing capacity requested by that thread. Edges between nodes can also be assigned a value, with this value representing the nearness of the threads the affinity analyzer 200 connects (the assigned edge value is higher when the nearness is higher). As requested processing capacity and thread nearness are functions of time and project load (i.e., they change over time and with different inputs), the affinity analyzer 200 can average/estimate across time and project load to assign the node and edge values.

The affinity analyzer 200 can then retrieve the number and size of NUMA nodes available. At this point, based on the input, the affinity analyzer 200 can create groups of threads. The total nearness of a group can be calculated by summing up the edges from the thread graph 204 between group members. The affinity analyzer 200 can then split the thread graph 204 into as many groups as there are NUMA nodes such that the sum of the groups' nearness is maximized, under the constraint that the groups' requested processing capacity is evenly balanced across groups. The affinity analyzer 200 can then assign each thread group to a different NUMA node.

In an example embodiment, the affinity analyzer 200 can take advantage of runtime information to determine that thread groups should change over time as thread nearness and thread processing capacity requirements change. At configurable intervals, the affinity analyzer 200 can re-evaluate optimal thread grouping based on current runtime information and adjust the assignment of threads to NUMA nodes as needed.

Figure 3:
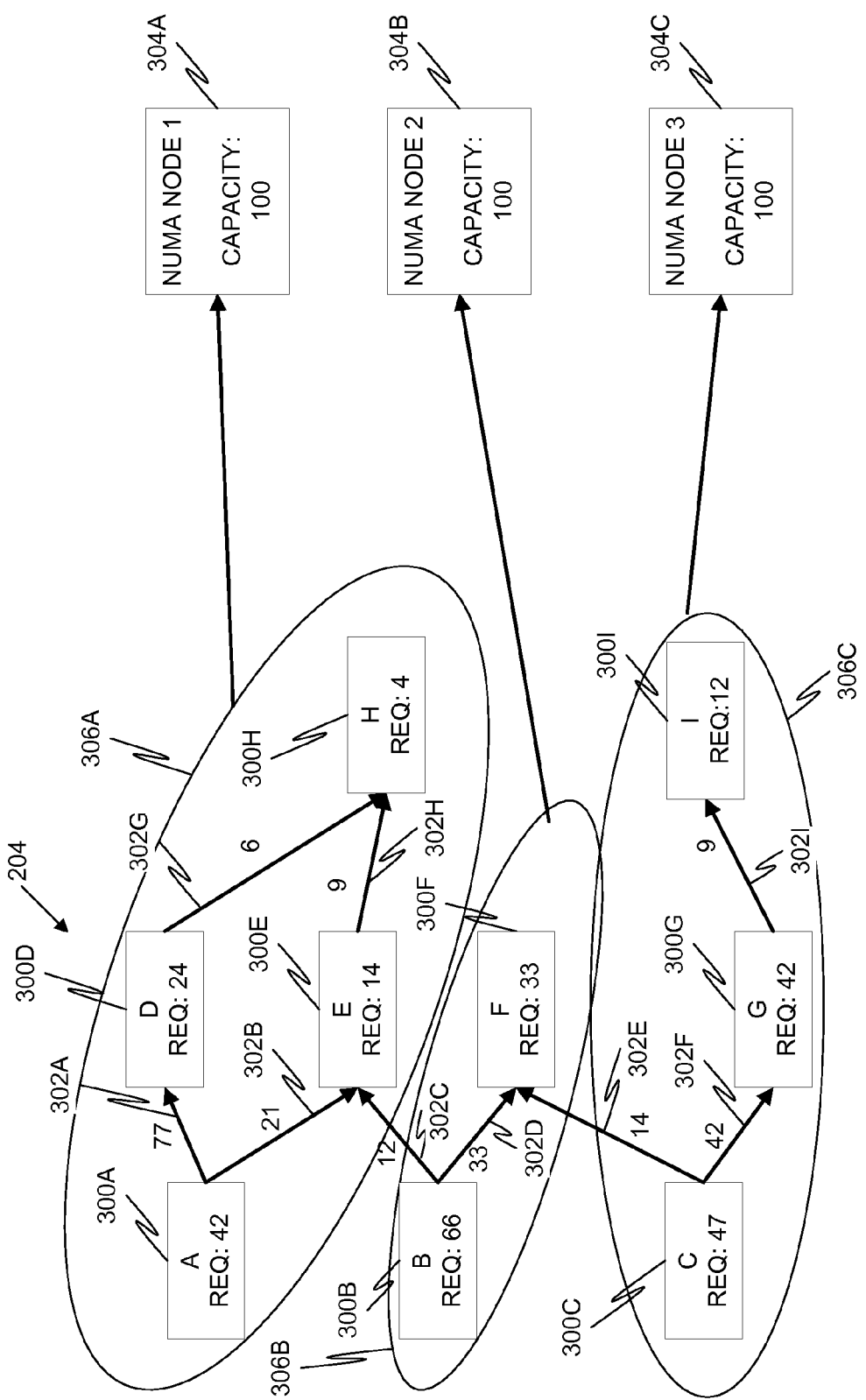
FIG. 3 is a diagram illustrating an example thread graph, in accordance with an example embodiment.

FIG. 3 is a diagram illustrating an example thread graph 204, in accordance with an example embodiment. Here, thread graph 204 includes Nodes 300A-I. Dependencies between Nodes 300A-I are depicted as edges 302A-I. As can be seen, each node 300A-I can be assigned a value based on its desire for processing capacity. This value can be, for example, an absolute value representing the number of processing cycles or data amounts per time period, or a relative value such as a score assigned on a particular scale (e.g., 1-100). Additionally, each edge 302A-I can be assigned a value based on the nearness calculated for the two nodes the affinity analyzer 200 connects. Thus, for example, Node 300A has a processing request of "42" and interacts with Node 300D, which has a processing request of "24," and Node 300E, which has a processing request of "14." The nearness measured between Node 300A and Node 300D is indicated on edge 302A as "77," while the nearness measured between Node 300A and Node 300E is indicated on edge 302B as "21." As with the request for processing capacity, nearness can be, for example, an absolute value representing the amount of data transferred per time period, or a relative value such as a score assigned on a particular scale.

The affinity analyzer 200 can utilize this information, as well as information about processing capacity of processing nodes 304A-304C and can calculate one or more thread groups 306A-306C, with each thread group 306A-306C corresponding to a different processing node 304A-304C on which threads in the thread group 306A-306C should be run. Here, for example, the affinity analyzer 200 can calculate that Nodes 300A, 300D, 300E, and 300H should be part of thread group 306A and run on processing node 304A. The affinity analyzer 200 can also calculate that Nodes 300B and 300F should be part of thread group 306B and run on processing node 304B, while Nodes 300C, 300G, and 300I should be part of thread group 306C and run on processing node 304C.

Figure 4:
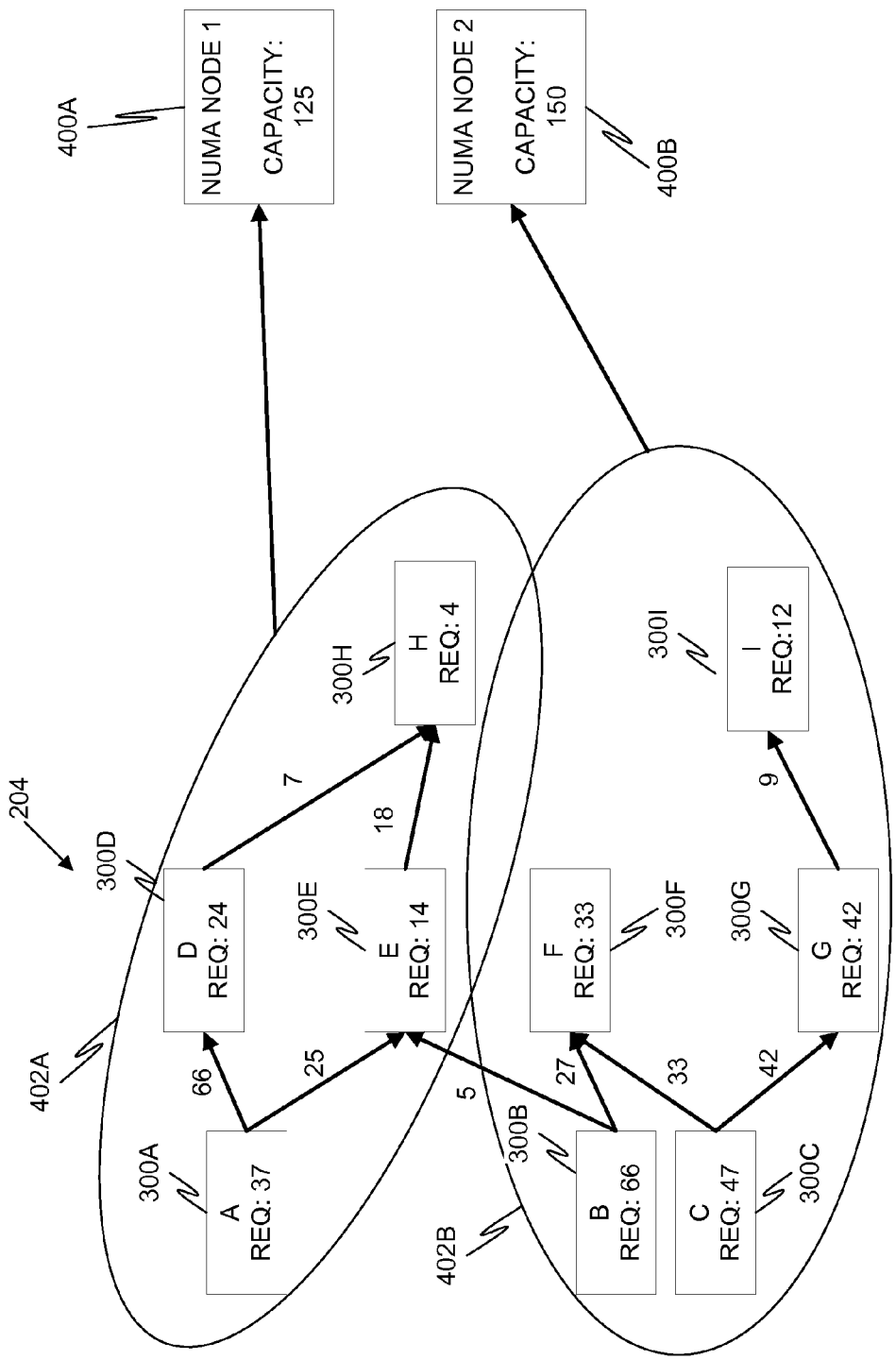
FIG. 4 is a diagram illustrating an example thread graph, in accordance with another example embodiment.

FIG. 4 is a diagram illustrating an example thread graph 204, in accordance with another example embodiment. This can represent the same thread graph 204 as depicted in FIG. 3, but at a different time when processing request and nearness measurements can have changed (along with available processing nodes 400A-400B and their corresponding processing capacities). Alternatively, this can represent a different thread graph and system than depicted in FIG. 3. In this instance, Nodes 300A, 300D, 300E, and 300H are all part of thread group 402A assigned to processing node 400A, while Nodes 300B, 300C, 300F, 300G, and 300I are part of thread group 402B assigned to processing node 400B.

Figure 5:
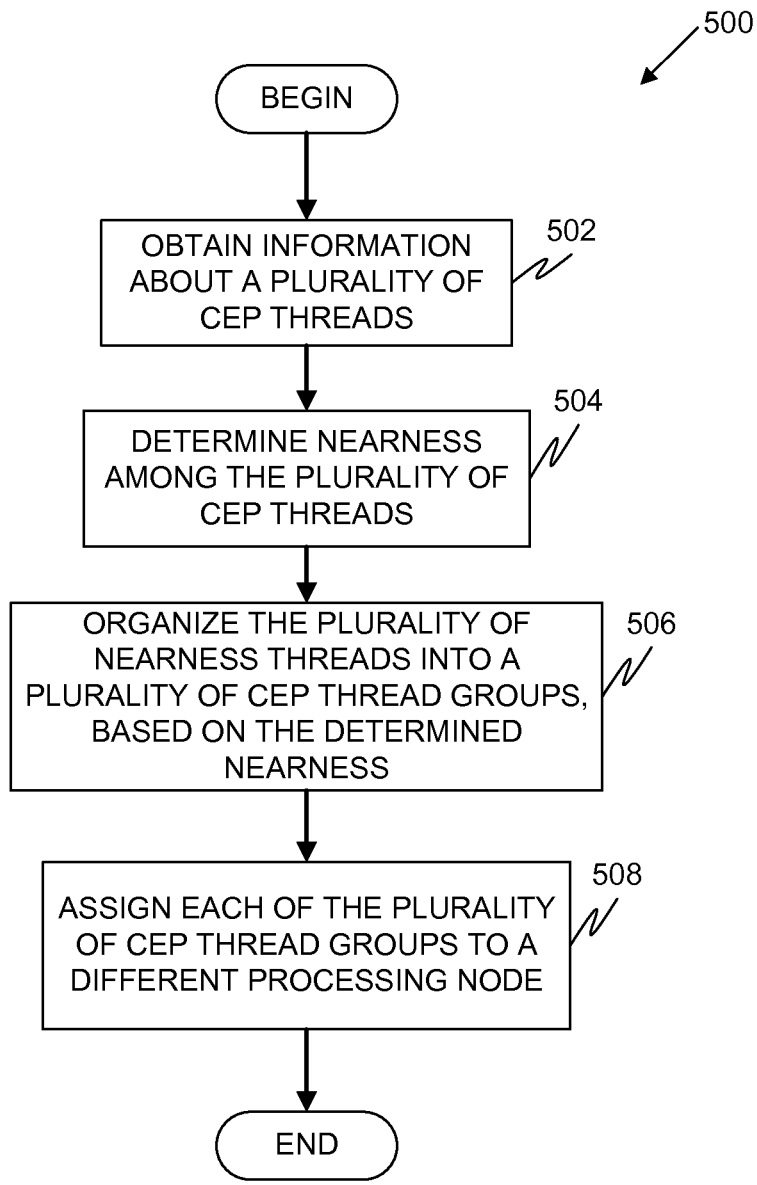
FIG. 5 is a flow diagram illustrating a method, in accordance with an example embodiment, for optimizing performance in a CEP system.

FIG. 5 is a flow diagram illustrating a method 500, in accordance with an example embodiment, for optimizing performance in a CEP system. Each of the operations performed in the method 500 can be performed at, for example, an affinity analyzer 200 or similar component in an ESP engine 102. The method 500 can be performed by processing logic that can comprise hardware (e.g., circuitry, dedicated logic, programmable logic, microcode, etc.), software (e.g., instructions run on a processing device), or a combination thereof At operation 502, information is obtained about a plurality of CEP threads. At operation 504, nearness among the plurality of CEP threads is determined Nearness between a first and a second CEP thread can indicate how much interaction is expected to occur between the first and second CEP thread. Determining nearness can include creating a DAG, with each of the plurality of CEP threads assigned a different node in the DAG and edges between nodes representing data dependencies among the threads, and wherein each edge in the DAG is assigned a nearness value. If this operation is performed at runtime, nearness can be measured by calculating an actual amount of data transmitted between the first and second threads during a set period.

At operation 506, the plurality of CEP threads are organized into a plurality of CEP thread groups, based on the determined nearness. At operation 508, each of the plurality of CEP thread groups are assigned to a different processing node, with each processing node having one or more processors and a memory. In an example embodiment, each processing node is a NUMA node.

Figure 6:
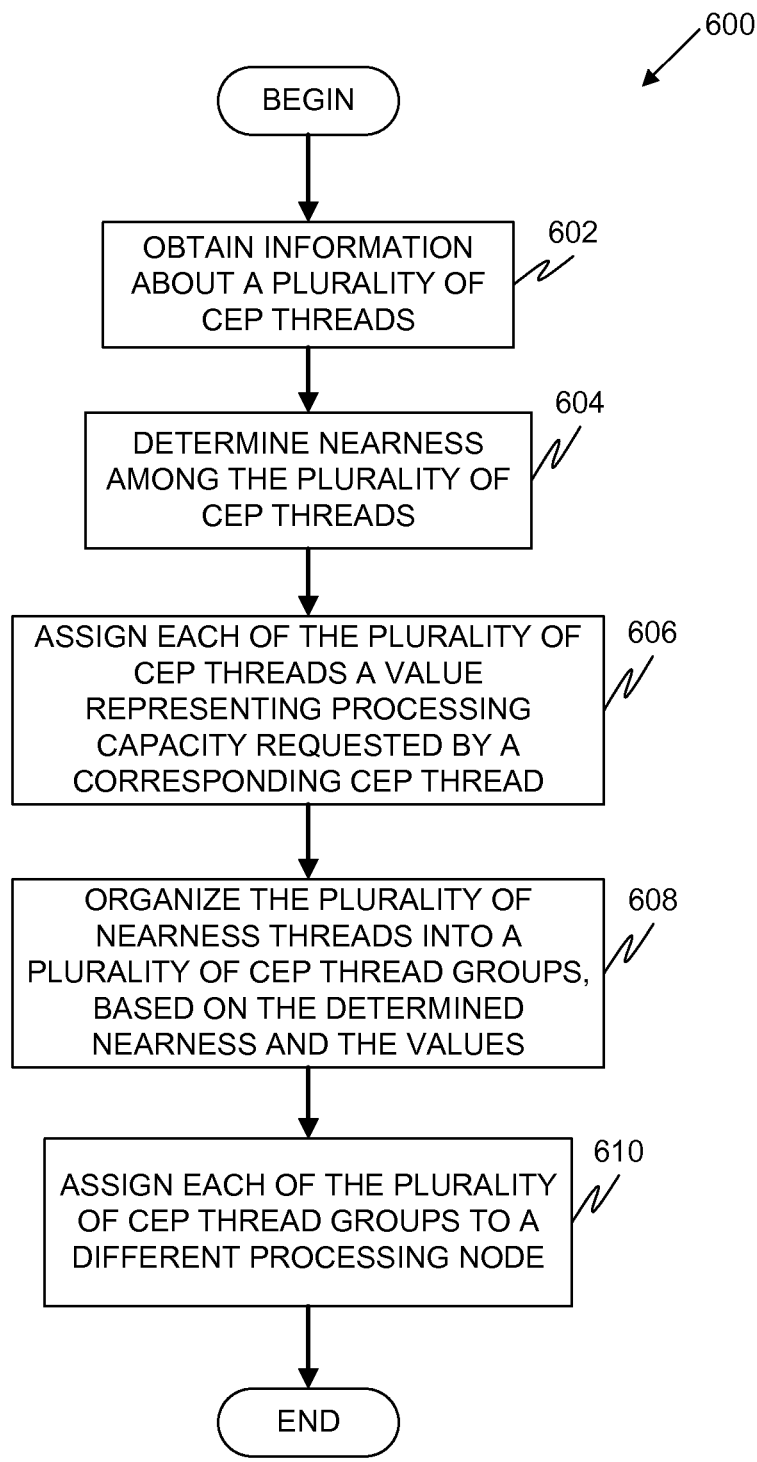
FIG. 6 is a flow diagram illustrating a method, in accordance with another example embodiment, for optimizing performance in a CEP system.

FIG. 6 is a flow diagram illustrating a method 600, in accordance with another example embodiment, for optimizing performance in a CEP system. As with FIG. 5, each of the operations performed in the method 600 can be performed at, for example, an affinity analyzer 200 or similar component in an ESP engine 102. The method 600 can be performed by processing logic that can comprise hardware (e.g., circuitry, dedicated logic, programmable logic, microcode, etc.), software (e.g., instructions run on a processing device), or a combination thereof At operation 602, information is obtained about a plurality of CEP threads. At operation 604, nearness among the plurality of CEP threads is determined Nearness between a first and a second CEP thread can indicate how much interaction is expected to occur between the first and second CEP thread. Determining nearness can include creating a DAG, with each of the plurality of CEP threads assigned a different node in the DAG and edges between nodes representing data dependencies among the threads. Each edge in the DAG is assigned a nearness value. If this operation is performed at runtime, nearness can be measured by calculating an actual amount of data transmitted between the first and second threads during a set period.

At operation 606, each of the plurality of CEP threads is assigned a value representing processing capacity requested by a corresponding CEP thread. At operation 608, the plurality of CEP threads are organized into a plurality of CEP thread groups, based on the determined nearness and based on the values for each of the plurality of CEP threads and information about processing capacity of each processing node. At operation 610, each of the plurality of CEP thread groups is assigned to a different processing node. Each processing node has one or more processors and a memory.

Example Mobile Device

Figure 7:
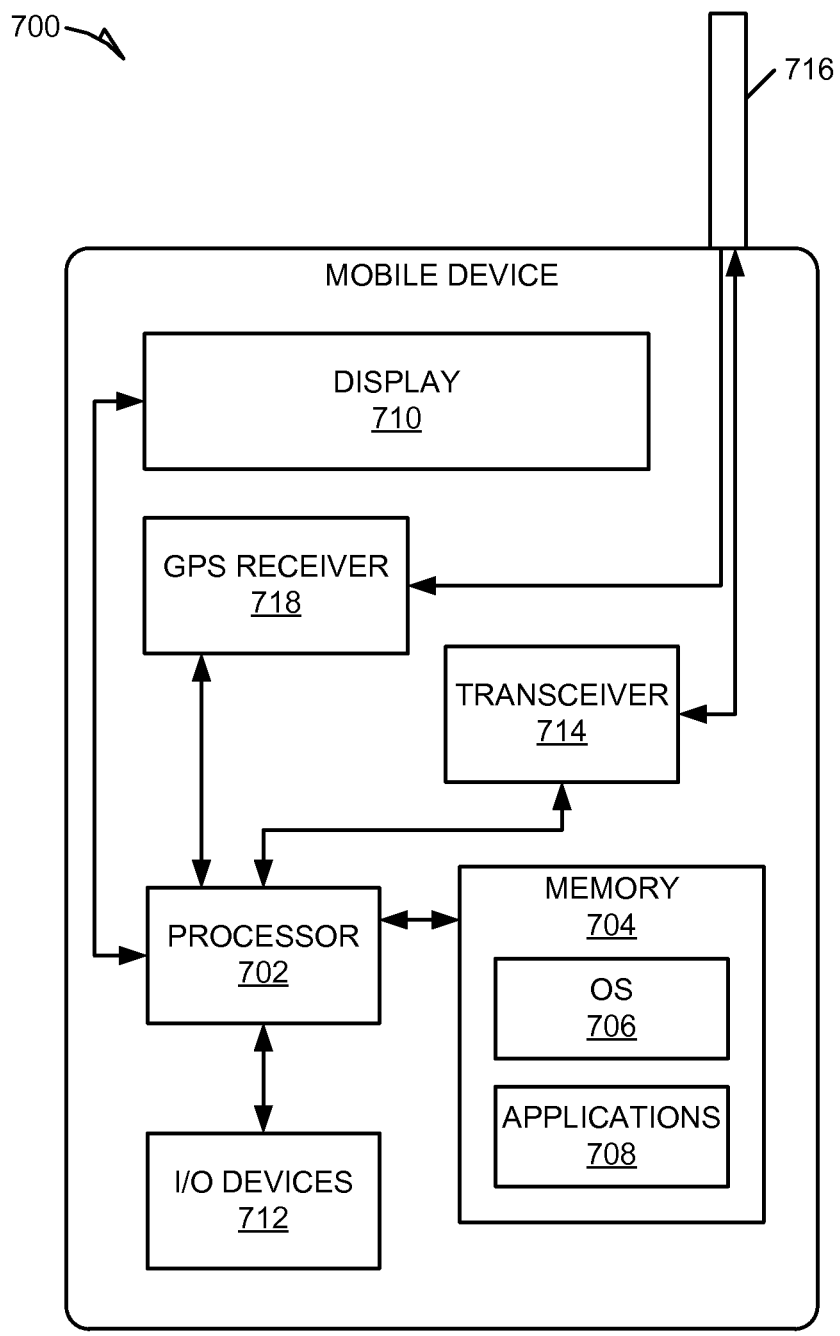
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or other type of memory, is typically accessible to the processor 702. The memory 704 can be adapted to store an operating system (OS) 706, as well as application programs 708. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors 702 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 702 or other programmable processor 702) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 702 configured using software, the general-purpose processor 702 can be configured as respective different hardware-implemented modules at different times. Software can accordingly configure a processor 702, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output 114 of that operation in a memory device to which it is communicatively coupled. A further hardware-implemented module can then, at a later time, access the memory device to retrieve and process the stored output 114. Hardware-implemented modules can also initiate communications with input or output devices, and can operate on a resource (e.g., a collection of information).

The various operations of example methods described herein can be performed, at least partially, by one or more processors 702 that are temporarily configured (e.g., by software) or permanently configured to perform the relevant operations. Whether temporarily or permanently configured, such processors 702 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors 702 or processor-implemented modules. The performance of certain of the operations can be distributed among the one or more processors 702, not only residing within a single machine, but deployed across a number of machines. In some example embodiments, the processor 702 or processors 702 can be located in a single location (e.g., within a home environment, an office environment or as a server farm), while in other embodiments the processors 702 can be distributed across a number of locations.

The one or more processors 702 can also operate to support performance of the relevant operations in a "cloud computing" environment or as a "software as a service" (SaaS). For example, at least some of the operations can be performed by a group of computers (as examples of machines including processors 702), these operations being accessible via a network (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 702, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 702 executing a computer program to perform functions by operating on input data and generating output 114. Method operations can also be performed by, and apparatus of example embodiments can be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 702), or a combination of permanently and temporarily configured hardware can be a design choice. Below are set out hardware (e.g., machine) and software architectures that can be deployed, in various example embodiments.

Example Machine Architecture and Machine-Readable Medium

Figure 8:
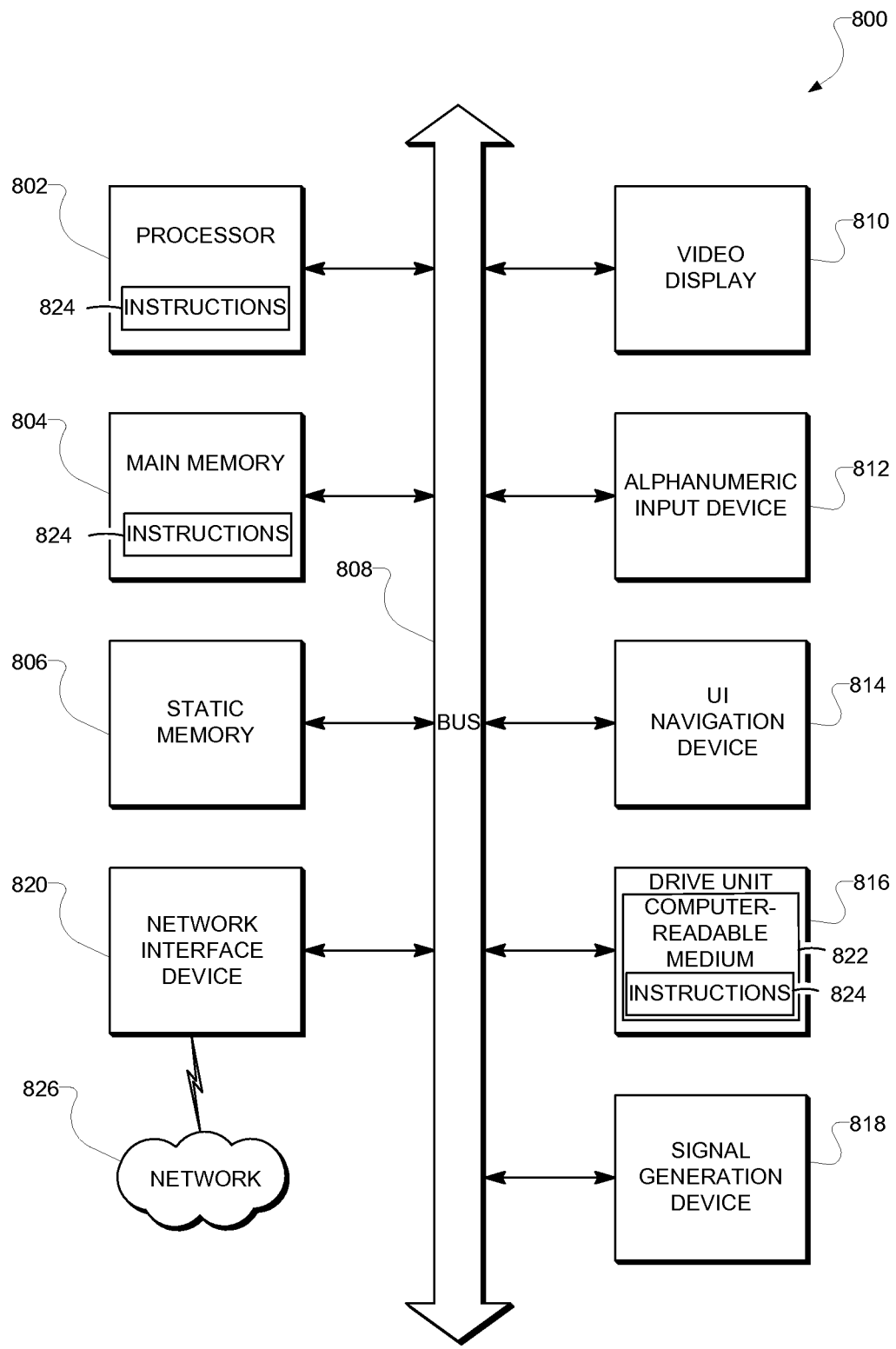
FIG. 8 is a block diagram of machine in the example form of a computer system within which instructions, for causing the machine to perform any one or more of the methodologies discussed herein, can be executed.

FIG. 8 is a block diagram of machine in the example form of a computer system 800 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a CPU, a graphics processing unit (GPU), or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media 822.

While the machine-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions 824 for execution by the machine and that cause the machine to perform any one or more of the methodologies of the present disclosure or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 824 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for optimizing performance in a complex event stream (CEP) system, the method comprising:
   obtaining, using one or more hardware processors, information about a plurality of CEP threads;
   determining, using the one or more hardware processors, nearness among the plurality of CEP threads, wherein determining nearness between a first and a second CEP thread indicates how much interaction is expected to occur between the first and second CEP thread and includes creating a Directed Acyclic Graph (DAG), with each of the plurality of CEP threads assigned a different node in the DAG and edges between nodes representing data dependencies among the threads, and wherein each edge in the DAG is assigned a nearness value, the nearness value between the first and second threads being measured by calculating an actual amount of data transmitted between the first and second threads during a set period;
   organizing the plurality of CEP threads into a plurality of CEP thread groups, based on the determined nearness; and
   assigning, using the one or more hardware processors, each of the plurality of CEP thread groups to a different processing node of a plurality of processing nodes, each processing node having one or more processors and a memory.

2. The method of claim 1, wherein each processing node is a non-uniform memory access (NUMA) node.

3. The method of claim 1, further comprising:
   assigning each of the plurality of CEP threads a value representing processing capacity requested by a corresponding CEP thread; and
   wherein the organizing is also based on the values for each of the plurality of CEP threads and information about processing capacity of each processing node.

4. The method of claim 1, wherein the method is performed during startup time.

5. The method of claim 1, wherein the method is performed during runtime.

6. The method of claim 1, wherein the nearness is determined at least partially based on one or more user hints, the one or more user hints indicating whether a particular thread is dynamic, semi-static, or static.

7. An apparatus comprising:
   an event stream processing engine comprising:
   an affinity analyzer executable by a processor and configured to:
   obtain information about a plurality of CEP threads;
   determine nearness among the plurality of CEP threads, wherein determining nearness between a first and a second CEP thread indicates how much interaction is expected to occur between the first and second CEP thread and includes creating a Directed Acyclic Graph (DAG), with each of the plurality of CEP threads assigned a different node in the DAG and edges between nodes representing data dependencies among the threads, and wherein each edge in the DAG is assigned a nearness value, the nearness value between the first and second threads being measured by calculating an actual amount of data transmitted between the first and second threads during a set period;

organize the plurality of CEP threads into a plurality of CEP thread groups, based on the determined nearness; and assign each of the plurality of CEP thread groups to a different processing node, each processing node having one or more processors and a memory.

8. The apparatus of claim 7, wherein the apparatus is coupled to one or more input adapters receiving input from at least one of the following:

market data feeds, a message bus, network monitoring, application transactions, and internal event streams.

9. A non-transitory machine-readable storage medium comprising instructions, which when implemented by one or more machines, cause the one or more machines to perform operations for optimizing performance in a complex event stream (CEP) system, the operations comprising:

obtaining, using one or more hardware processors, information about a plurality of CEP threads;

determining, using the one or more hardware processors, nearness among the plurality of CEP threads, wherein determining nearness between a first and a second CEP thread indicates how much interaction is expected to occur between the first and second CEP thread and includes creating a Directed Acyclic Graph (DAG), with each of the plurality of CEP threads assigned a different node in the DAG and edges between nodes representing data dependencies among the threads, and wherein each edge in the DAG is assigned a nearness value, the nearness value between the first and second threads being measured by calculating an actual amount of data transmitted between the first and second threads during a set period;

organizing the plurality of CEP threads into a plurality of CEP thread groups, based on the determined nearness; and assigning, using the one or more hardware processors, each of the plurality of CEP thread groups to a different processing node of a plurality of processing nodes, each processing node having one or more processors and a memory.

10. The non-transitory machine-readable storage medium of claim 9, wherein each processing node is a non-uniform memory access (NUMA) node.

11. The non-transitory machine-readable storage medium of claim 9, further comprising:

assigning each of the plurality of CEP threads a value representing processing capacity requested by a corresponding CEP thread; and wherein the organizing is also based on the values for each of the plurality of CEP threads and information about processing capacity of each processing node.

12. The non-transitory machine-readable storage medium of claim 9, wherein the method is performed during startup time.

13. The non-transitory machine-readable storage medium of claim 9, wherein the method is performed during runtime.

14. The non-transitory machine-readable storage medium of claim 9, wherein the nearness is determined at least partially based on one or more user hints, the one or more user hints indicating whether a particular thread is dynamic, semi-static, or static.

* * * * *